United States Patent Office 3,706,688
Patented Dec. 19, 1972

3,706,688
GLASS COLOR FILTER FOR USE UNDER DAYLIGHT COLOR FLUORESCENT LIGHT
Takashi Matsuura and Mitsuo Chikano, Tokyo, Japan, assignors to Hoya Glass Works, Tokyo, Japan
Filed Sept. 20, 1971, Ser. No. 181,782
Claims priority, application Japan, Sept. 18, 1970, 45/81,805
Int. Cl. F21v 9/00; C03c 3/10, 3/30
U.S. Cl. 252—300                               1 Claim

ABSTRACT OF THE DISCLOSURE

A glass color filter suitable for use in color photography under daylight color fluorescent light is prepared from a glass composition comprising 100 parts of base glass composed of, by weight, 50–70% silicic acid anhydride, 8–17% lead oxide, 13–23% of either one or both of sodium oxide and potassium oxide, 3–12% of either one or both of calcium oxide and magnesium oxide, and 0.2–0.5% arsenic oxide, and a coloring agent composed of, by weight, 2.0–4.0% cerium oxide, 2.5–5.0% titanium oxide, 0.001–0.02 nickel oxide, 0.8–2.2% manganese dioxide, and 0.3–2.5% neodymium oxide.

BACKGROUND OF THE INVENTION

It is generally known that color photographic films give various color reproductions according to the kind of light source used for illumination, and correct color reproduction is not expected unless a light source suitable for the film is used. For instance, daylight-type color photographic films reproduce correct colors when exposed to natural light (sunlight). When the color temperature of a given light does not correspond with that of the color photographic film, it is common practice to correct the color reproduction in color photography by mounting a color temperature elevating or decreasing filter in a camera.

FIELD OF THE INVENTION

This invention relates to a glass color filter for use in taking color photographs under a daylight color fluorescent light.

BRIEF DESCRIPTION OF THE DRAWINGS

In the accompanying drawings.

DESCRIPTION OF THE INVENTION

Figure 1:
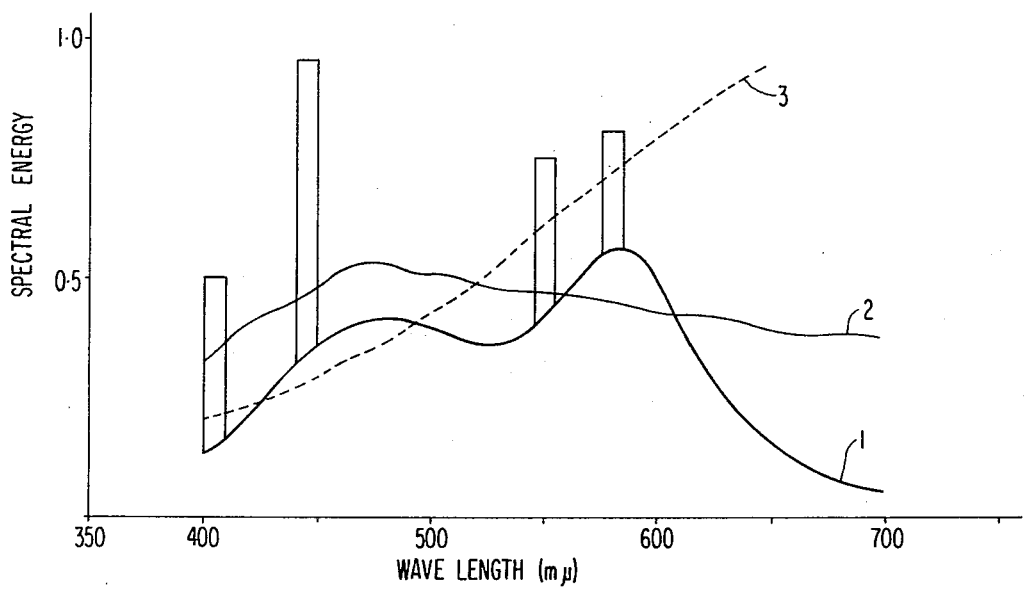
FIG. 1 is a diagram showing the spectral energy distribution curves of sunlight, electric light, and daylight color fluorescent light.

As shown in FIG. 1, the spectral energy distribution curve 1 of the daylight color fluorescent light differs greatly from the spectral energy distribution curve 2 of sunlight, and experience tells that when a color photograph is taken under the illumination of daylight color fluorescent lamp without using a color filter, the resulting color photograph becomes a strongly bluish. Furthermore, the spectral energy distribution curve of the daylight color fluorescent lamp also differs from the spectral energy distribution curve 3 of electric light and has sharp bright line spectra in the vicinity of 400, 450, 550 and 580 m$\mu$. This indicates that a simple color temperature converting filter does not serve to give correct color reproduction.

Figure 2:
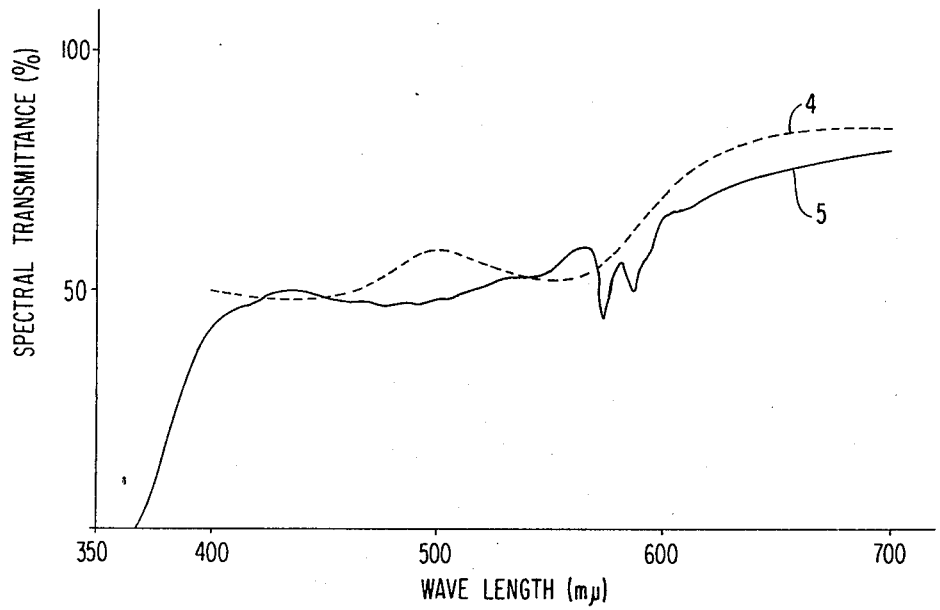
FIG. 2 is a diagram showing the spectral transmittance curves of the color glass filter of the present invention and a gelatin filter.

Gelatin filters for correcting colors in color photography under a daylight color fluorescent lamp have previously been proposed (see curve 4 in FIG. 2). However, color correction with such gelatin filters is not sufficient, and there are defects such as poor flatness caused by the lamination of a plurality of filter elements, or marked color fading because of its organic nature. On the other hand, it has been considered impossible to produce glass filters having such a spectral transmittance curve.

We have derived the spectral transmittance curve of an ideal color filter from the spectral energy distribution of daylight color fluorescent light and the spectral sensitivity curve of a daylight-type color photographic film, and also made extensive work on glass coloring agents. This finally led to successful production of a stable glass color filter which is free from color fading and has superior color reproducibility as compared with the gelatin filter.

In FIG. 2, curve 4 shows the spectral transmittance of a gelatin filter which is considered to show good color reproduction when used in taking color photographs of the daylight type under the illumination of a daylight color fluorescent lamp. We have examined the spectral energy distribution of daylight color fluorescent light and the spectral sensitivity of a daylight type color photographic film so as to determine the spectral transmittance curve of an ideal color filter. As a result, we have found that the color reproduction in color photography is markedly improved by reducing the transmittance of the filter at the blue region (400–500 m$\mu$) and the green region (500–600 m$\mu$) stepwise without reducing the transmittance at the red region (600–700 m$\mu$) as much as possible, and sharply reducing the energy distribution and the bright line spectrum in the vicinity of 580 m$\mu$ of a daylight color fluorescent lamp as shown by curve 1 of FIG. 1.

However, a combination of glass coloring compounds which meets these requirements on the spectral transmittance curve has not been known. We have made extensive studies on the combination of glass coloring compounds and consequently found that the transmittance in the vicinity of 580 m$\mu$ can be sharply reduced selectively by absorbing the ultraviolet region through cerium oxide and titanium oxide, reducing the transmittance at the blue and green regions through manganese dioxide and nickel oxide, and allowing neodymium oxide to be copresent with manganese oxide. Hence, the present invention specifies glass ingredients most suitable for a color filter which is intended for use in taking daylight-type color photographs under the illumination of a daylight color fluorescent lamp.

According to the present invention, there is provided a glass graph color filter comprising 100 parts of base glass composed of, by weight, 50–70% silicic acid anhydride ($SiO_2$), 8–17% lead oxide, 13–23% of either one or both of sodium oxide ($Na_2O$) and potassium oxide ($K_2O$), 3–12% of either one or both of calcium oxide (CaO) and magnesium oxide (MgO), and 0.2–0.5% arsenic oxide ($As_2O_3$), and a coloring agent composed of, by weight, 2.0–4.0% cerium oxide ($Ce_2O_3$), 2.5–5.0% titanium oxide ($TiO_2$), 0.001–0.01% nickel oxide (NiO), 0.80–2.20% manganese dioxide ($MnO_2$) and 0.30–2.50% neodymium oxide.

The glass filter can be prepared by melting these ingredients and forming them into glass in a customary manner. One example of the spectral transmittance curve of the resulting filter is shown by curve 5 in FIG. 2.

Silicic acid anhydride is a principal ingredient of the glass according to the present invention. If its amount is below 50%, the resulting glass has poor resistance to weather, and excessive coefficient of thermal expansion. If the amount exceeds 70%, the glass batch is difficult to melt at ordinary melting operation temperatures.

Lead oxide assists the ultraviolet absorbing ability of cerium oxide and titanium oxide added for the purpose of absorbing ultraviolet rays. If the amount exceeds 17%, the red region absorption by manganese dioxide increases to a disadvantage.

Sodium oxide and potassium oxide are essential ingredients for glass formation and facilitate glass melting. If the amount is below 13%, these ingredients do not produce any significant effect. On the other hand, amounts above 23% cause an increase in the red region absorption of manganese dioxide to disadvantage.

Calcium oxide and magnesium oxide serve to control the viscosity of glass during the melting and processing operations and to improve the weather resistance of glass. If the amount of these ingredients is less than 3%, no significant effect can be obtained. On the other hand, amounts above 12% result in excessive viscosity, and do not contribute to the improvement of the weather resistance.

Arsenic oxide is added as a clarifying agent and its amount is controlled within the above-mentioned range depending upon the contents of the other ingredients.

The spectral characteristics of the glass filter of the present invention are that the ultraviolet region is completely absorbed, the transmittance at the red region is maximized, the transmittance at the blue and green regions are slightly reduced, and the light in the vicinity of 580 m$\mu$ is selectively absorbed. In order to impart these properties to glass, cerium oxide and titanium oxide are used to absorb the ultraviolet region, manganese dioxide to absorb the green region and some of the blue region, nickel oxide to absorb the blue region mainly, and neodymium oxide to sharply absorb the light in the vicinity of 580 m$\mu$ selectively. In order to obtain a constant spectral transmittance with varying thickness of glass, the amounts of the coloring compounds should be changed according to the thickness of glass within the above-mentioned ranges. The glass filter of the invention is mounted on the lens portion of a photographing apparatus, and glass filters of various sizes should be prepared according to the type of the photographing apparatus and the diameter of the lens used. With larger sizes, the thickness of the glass must be increased; otherwise the flatness of the filter after polishing may be adversely affected.

The invention will be described by the following examples in which all percentages are by weight.

EXAMPLE 1

To 100 parts of base glass composed of:

| | Percent |
|---|---|
| Silicic acid anhydride | 67.3 |
| Lead oxide | 11.0 |
| Sodium oxide | 14.4 |
| Potassium oxide | 3.0 |
| Calcium oxide | 2.0 |
| Magnesium oxide | 2.0 |
| Arsenic oxide | 0.3 | were added the following coloring ingredients

| | |
|---|---|
| Cerium oxide | 2.6 |
| Titanium oxide | 3.3 |
| Nickel oxide | 0.004 |
| Manganese dioxide | 1.5 |
| Neodymium oxide | 1.5 |

The mixture was melted in air at about 1400° C., and the resulting glass was optically polished to a thickness of 2.5 mm. The spectral transmittance of the resulting glass filter was measured, and indicated as curve 5 in FIG. 2. The glass filter obtained was suitable as a glass color filter for use under a daylight color fluorescent lamp.

EXAMPLE 2

To 100 parts of base glass composed of:

| | Percent |
|---|---|
| Silicic acid anhydride | 54.8 |
| Lead oxide | 14.9 |
| Sodium oxide | 17.9 |
| Potassium oxide | 3.0 |
| Calcium oxide | 7.0 |
| Magnesium oxide | 2.0 |
| Arsenic oxide | 0.4 | were added the following coloring components

| | |
|---|---|
| Cerium oxide | 3.2 |
| Titanium oxide | 3.8 |
| Nickel oxide | 0.01 |
| Manganese dioxide | 2.0 |
| Neodymium oxide | 1.8 |

The mixture was melted and formed into glass in a customary manner, and optically polished to a thickness of 1.0 mm. The spectral transmittance of the resulting filter was measured. It was found that the spectral transmittance curve of this filter resembles the curve 5 shown in FIG. 2, and the filter was suitable as a filter with small thickness for correction of color under a daylight color fluorescent lamp.

EXAMPLE 3

To 100 parts of base glass composed of:

| | Percent |
|---|---|
| Silicic acid anhydride | 59.8 |
| Lead oxide | 13.9 |
| Sodium oxide | 9.0 |
| Potassium oxide | 10.0 |
| Calcium oxide | 5.0 |
| Magnesium oxide | 2.0 |
| Arsenic oxide | 0.3 | were added the following coloring compounds:

| | |
|---|---|
| Cerium oxide | 2.2 |
| Titanium oxide | 2.8 |
| Nickel oxide | 0.0015 |
| Manganese dioxide | 0.002 |
| Neodymium oxide | 0.8 |

The mixture was melted and formed into glass, and optically polished to a thickness of 4.0 mm. in the same way as set in Example 1. The spectral transmittance curve was measured, and found to resemble the curve 5 in FIG. 2. The resulting glass was suitable as a filter of large thickness for color correction under a daylight color fluorescent lamp.

The glass color filters obtained in these examples have better color reproducibility than the gelatin filter, and also have the advantage that optical flatness can be easily obtained, and they are free from degeneration and deterioration over long periods of time.

What is claimed is:

1. A glass color filter for use under daylight color fluorescent light, said filter comprising 100 parts of base glass composed of, by weight, 50–70% silicic acid anhydride, 8–17% lead oxide, 13–23% of either one or both of sodium oxide and potassium oxide, 3–12% of either one or both of calcium oxide and magnesium oxide, and 0.2–0.5% arsenic oxide, and a coloring agent composed of, by weight, 2.0–4.0% cerium oxide, 2.5–5.0% titanium oxide, 0.001–0.02% nickel oxide, 0.8–2.2% manganese dioxide, and 0.3–2.5% neodymium oxide.

References Cited
UNITED STATES PATENTS

| | | | | |
|---|---|---|---|---|
| 2,524,719 | 10/1950 | Tillyor | | 106—52 |
| 2,692,833 | 10/1954 | Armistead | | 106—53 |
| 3,457,182 | 7/1969 | Lee, Jr. et al. | | 252—301.4 F |
| 3,471,409 | 10/1969 | Lee, Jr. et al. | | 252—301.4 F |

FOREIGN PATENTS 632,906  12/1949  Great Britain _____ 106—53

JAMES E. POER, Primary Examiner

M. L. BELL, Assistant Examiner

U.S. Cl. X.R.

106—53, 47 Q